(12) United States Patent
Zhao et al.

(10) Patent No.: US 12,510,300 B2
(45) Date of Patent: Dec. 30, 2025

(54) HEAT EXCHANGER AND AIR CONDITIONING SYSTEM

(71) Applicant: SANHUA (HANGZHOU) MICRO CHANNEL HEAT EXCHANGER CO., LTD., Zhejiang (CN)

(72) Inventors: Dengji Zhao, Zhejiang (CN); Jianlong Jiang, Zhejiang (CN); Qiang Gao, Zhejiang (CN); Yue Zhang, Zhejiang (CN)

(73) Assignee: SANHUA (HANGZHOU) MICRO CHANNEL HEAT EXCHANGER CO., LTD., Zhejiang (CN)

( * ) Notice: Subject to any disclaimer, the term of this patent is extended or adjusted under 35 U.S.C. 154(b) by 159 days.

(21) Appl. No.: 18/284,904

(22) PCT Filed: Mar. 29, 2022

(86) PCT No.: PCT/CN2022/083733
§ 371 (c)(1),
(2) Date: Sep. 29, 2023

(87) PCT Pub. No.: WO2022/206765
PCT Pub. Date: Oct. 6, 2022

(65) Prior Publication Data
US 2024/0175636 A1    May 30, 2024

(30) Foreign Application Priority Data
Mar. 29, 2021    (CN) .......................... 202110335619.8

(51) Int. Cl.
*F28D 7/16* (2006.01)
*F28F 1/04* (2006.01)
*F28D 1/04* (2006.01)

(52) U.S. Cl.
CPC .............. *F28D 7/1653* (2013.01); *F28F 1/04* (2013.01); *F28D 1/0426* (2013.01); *F28F 2215/04* (2013.01)

(58) Field of Classification Search
CPC .... F25B 39/00; F28D 1/0426; F28F 2215/04; F28F 1/04
See application file for complete search history.

(56) References Cited

U.S. PATENT DOCUMENTS

| | | | |
|---|---|---|---|
| 2009/0154091 A1* | 6/2009 | Yatskov | F28F 1/022 165/104.33 |
| 2013/0292098 A1* | 11/2013 | Jindou | F28F 17/005 165/151 |

(Continued)

FOREIGN PATENT DOCUMENTS

| | | |
|---|---|---|
| CN | 101464102 A | 6/2009 |
| CN | 101738008 A | 6/2010 |

(Continued)

OTHER PUBLICATIONS

Translation of CN102192672A named Translation—CN102192672A (Year: 2011).*

(Continued)

*Primary Examiner* — Paul Alvare
(74) *Attorney, Agent, or Firm* — Bridgeway IP Law Group, PLLC; Jihun Kim

(57) ABSTRACT

A heat exchanger includes: a first assembly including first and second tubes; a second assembly including third and fourth tubes; a plurality of heat exchange tubes including first and second heat exchange tubes; and fins. The first heat exchange tube is in communication with the first and third tubes, the second heat exchange tube is in communication with the second and fourth tubes, and the first heat exchange tube, the fin and the second heat exchange tube are arranged in a length direction of the first tube. Both widths of the first (Continued)

and second heat exchange tubes are smaller than a width of the first fin, which is smaller than a sum of the widths of the first and second heat exchange tubes. Projections of the first and second heat exchange tubes in a plane perpendicular to the length direction of the first tube are at least partially non-coincident.

16 Claims, 16 Drawing Sheets

(56)  References Cited

U.S. PATENT DOCUMENTS

| | | | | |
|---|---|---|---|---|
| 2015/0338173 | A1* | 11/2015 | Katoh | F28F 1/12 165/172 |
| 2018/0299171 | A1* | 10/2018 | Olsen | F28F 9/0204 |
| 2019/0368817 | A1* | 12/2019 | Huang | F28D 1/0426 |
| 2020/0191490 | A1* | 6/2020 | Jin | F28D 1/0471 |
| 2022/0316813 | A1* | 10/2022 | Rambo | F28F 1/32 |

FOREIGN PATENT DOCUMENTS

| | | | |
|---|---|---|---|
| CN | 201689278 U | | 12/2010 |
| CN | 102192672 A | * | 9/2011 |
| CN | 210128532 U | | 3/2020 |
| CN | 212362502 U | | 1/2021 |
| CN | 212457512 U | | 2/2021 |
| JP | H0682188 A | | 3/1994 |
| JP | 2007232246 A | | 9/2007 |
| JP | 2009145010 A | | 7/2009 |
| JP | 2014029221 A | * | 2/2014 ......... F28D 1/05366 |
| WO | 2018053585 A1 | | 3/2018 |

OTHER PUBLICATIONS

Translation of JP2014029221A named Translation—JP2014029221A (Year: 2014).*

Li Jiaxing, "Office Action for CN Application No. 202110335619.8", Aug. 26, 2022, CNIPA, China.

* cited by examiner

HEAT EXCHANGER AND AIR CONDITIONING SYSTEM

CROSS-REFERENCE TO RELATED APPLICATIONS

The present application is a National Stage of International Application No. PCT/CN2022/083733, filed on Mar. 29, 2022, which claims the benefit of priority to Chinese Application No. 202110335619.8, filed on Mar. 29, 2021, both of which are incorporated by reference herein in their entireties for all purposes.

FIELD

The present disclosure relates to a field of heat exchangers, and in particular to a heat exchanger and an air conditioning system having the heat exchanger.

BACKGROUND

In the related art, an air conditioner with dual refrigeration systems adopts two separate refrigerant circuits, and a heat exchanger in the refrigerant circuit is a dual system heat exchanger to adapt to the air conditioner with the dual refrigeration systems. Taking a microchannel heat exchanger as an example, the microchannel heat exchanger in the system is shared by the two systems, and includes flat tube groups working in the two systems respectively, while two parts of heat exchange tubes share a part of fins.

However, when the heat exchanger with the dual systems having the above structure works in a unit, if the two systems work at the same time in some working conditions, there will be a case that the heat exchange performance is insufficient, because the two systems share the same heat exchange surface, which will affect the efficiency and use effect of the system.

SUMMARY

A heat exchanger according to embodiments of a first aspect of the present disclosure includes: a first assembly including a first tube and a second tube; a second assembly including a third tube and a fourth tube; a plurality of heat exchange tubes, in which each heat exchange tube is a flat tube and includes a plurality of channels extending along a length direction of the heat exchange tube and arranged at intervals in a width direction of the heat exchange tube, and the plurality of heat exchange tubes include a first heat exchange tube and a second heat exchange tube; one end of the first heat exchange tube is directly or indirectly connected with the first tube, the other end of the first heat exchange tube is directly or indirectly connected with the third tube, and the first heat exchange tube communicates the first tube with the third tube; one end of the second heat exchange tube is directly or indirectly connected with the second tube, the other end of the second heat exchange tube is directly or indirectly connected with the fourth tube, and the second heat exchange tube communicates the second tube with the fourth tube; and the first heat exchange tube and the second heat exchange tube are arranged at intervals in a length direction of the first tube, the first tube is not communicated with the second tube, and the third tube is not communicated with the fourth tube; and fins including a first fin, in which the first fin is connected with one first heat exchange tube and connected with one second heat exchange tube in the length direction of the first tube, and the first heat exchange tube, part of the first fin and the second heat exchange tube are arranged along the length direction of the first tube, in which a plurality of the first fins are provided. A width of the first heat exchange tube is smaller than a width of the first fin, a width of the second heat exchange tube is smaller than the width of the first fin, and the width of the first fin is smaller than a sum of the width of the first heat exchange tube and the width of the second heat exchange tube; and a plane perpendicular to the length direction of the first tube is defined as a first plane, and a projection of the first heat exchange tube in the first plane and a projection of the second heat exchange tube in the first plane are at least partially non-coincident.

An air conditioning system according to embodiments of a second aspect of the present disclosure includes a heat exchanger, a first circuit and a second circuit. The heat exchanger includes: a first assembly including a first tube and a second tube; a second assembly including a third tube and a fourth tube; a plurality of heat exchange tubes, in which each heat exchange tube is a flat tube and includes a plurality of channels extending along a length direction of the heat exchange tube and arranged at intervals in a width direction of the heat exchange tube, and the plurality of heat exchange tubes include a first heat exchange tube and a second heat exchange tube; one end of the first heat exchange tube is directly or indirectly connected with the first tube, the other end of the first heat exchange tube is directly or indirectly connected with the third tube, and the first heat exchange tube communicates the first tube with the third tube; one end of the second heat exchange tube is directly or indirectly connected with the second tube, the other end of the second heat exchange tube is directly or indirectly connected with the fourth tube, and the second heat exchange tube communicates the second tube with the fourth tube; and the first heat exchange tube and the second heat exchange tube are arranged at intervals in a length direction of the first tube, the first tube is not communicated with the second tube, and the third tube is not communicated with the fourth tube; and fins including a first fin, in which the first fin is connected with one first heat exchange tube and connected with one second heat exchange tube in the length direction of the first tube, and the first heat exchange tube, part of the first fin and the second heat exchange tube are arranged along the length direction of the first tube, in which a plurality of the first fins are provided. A width of the first heat exchange tube is smaller than a width of the first fin, a width of the second heat exchange tube is smaller than the width of the first fin, and the width of the first fin is smaller than a sum of the width W1 of the first heat exchange tube and the width of the second heat exchange tube; and a plane perpendicular to the length direction of the first tube is defined as a first plane, and a projection of the first heat exchange tube in the first plane and a projection of the second heat exchange tube in the first plane are at least partially non-coincident. The first circuit includes a first compressor and a first throttling device, and the first circuit is communicated with the first tube and the third tube of the heat exchanger. The second circuit includes a second compressor and a second throttling device, and the second circuit is communicated with a second tube and a fourth tube of the heat exchanger.

DETAILED DESCRIPTION

Hereinafter, the embodiments of the present disclosure will be described in detail, examples of which are illustrated in the accompanying drawings. The embodiments described below by referring to the accompanying drawings are illustrative and are intended to explain the present disclosure, and should not be construed as limiting the present disclosure.

As shown in FIGS. 1 to 10, a heat exchanger 100 according to the embodiments of the present disclosure includes a first assembly, a second assembly, fins and a plurality of heat exchange tubes 8.

Figure 1:
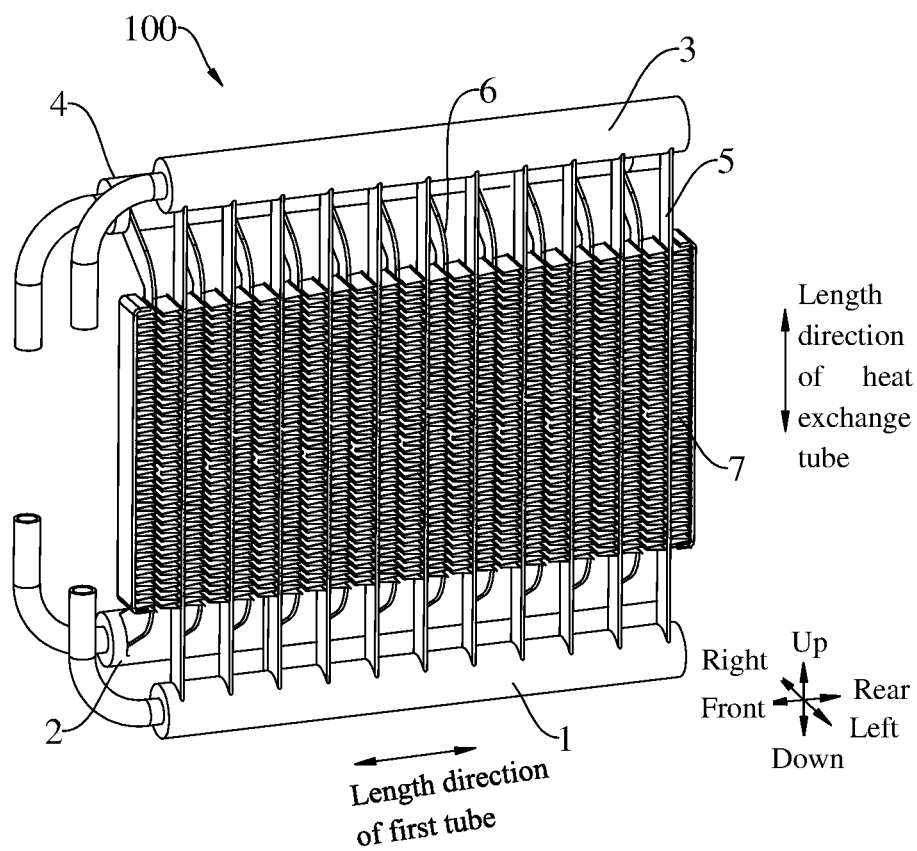
FIG. 1 is a perspective view of a heat exchanger according to an embodiment of the present disclosure.
Figure 2:
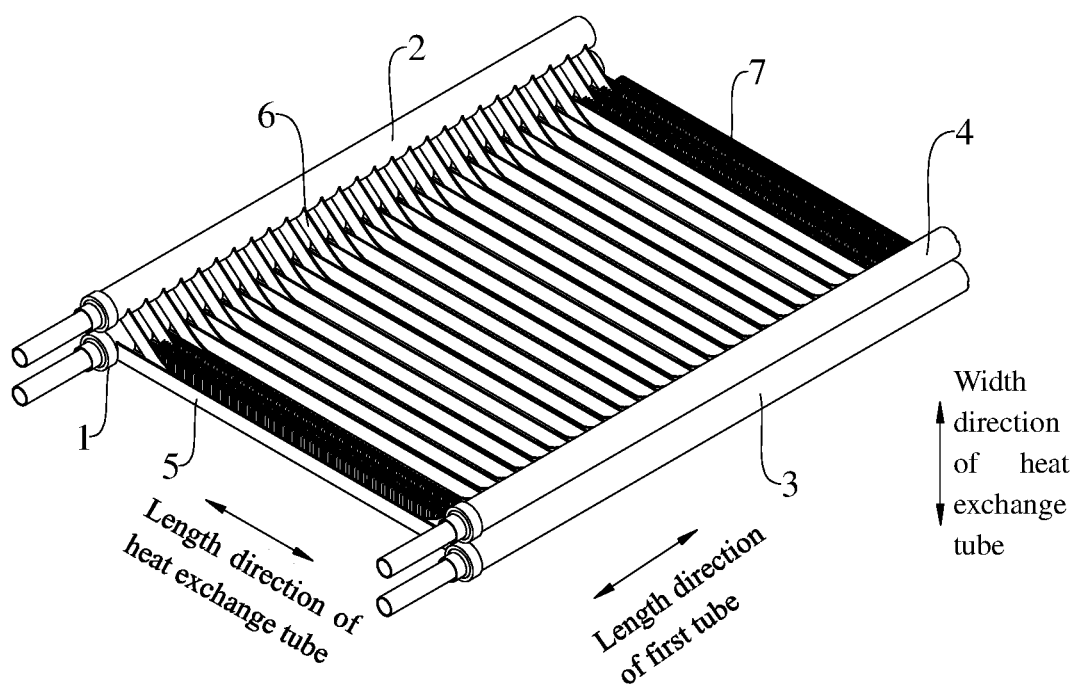
FIG. 2 is a perspective view of a heat exchanger according to another embodiment of the present disclosure.
Figure 3:
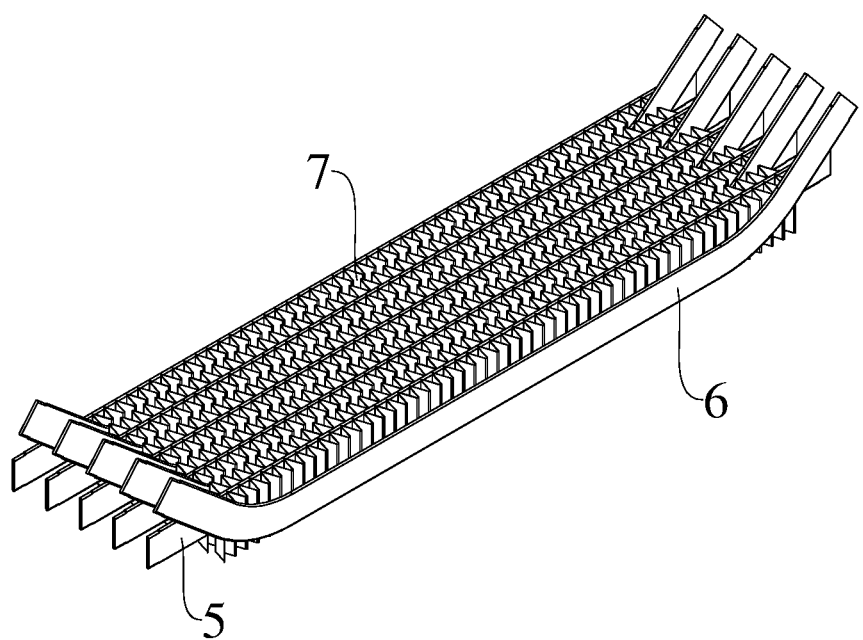
FIG. 3 is a schematic view of arrangement of a first heat exchange tube, a fin and a second heat exchange tube of the heat exchanger in FIG. 1.

The first assembly includes a first tube 1 and a second tube 2, and the second assembly includes a third tube 3 and a fourth tube 4. As shown in FIGS. 1 and 2, the first tube 1, the second tube 2, the third tube 3 and the fourth tube 4 all extend in a front-rear direction, and the first tube 1 and the second tube 2 are located below the third tube 3 and the fourth tube 4. The first tube 1 is located right below the third tube 3 and the second tube 2 is located right below the fourth tube 4.

Figure 4:
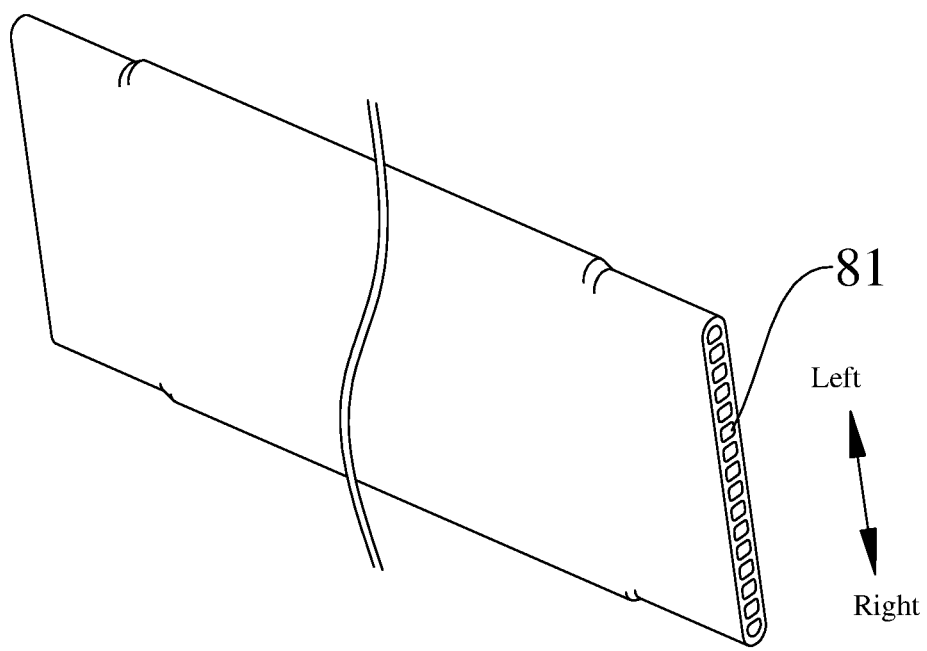
FIG. 4 is a perspective view of a heat exchange tube of the heat exchanger in FIG. 1.
Figure 5:
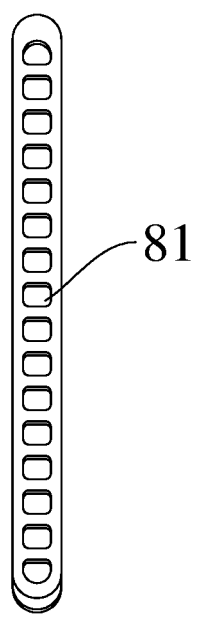
FIG. 5 is a cross-sectional view of the heat exchange tube in FIG. 4.

The heat exchange tube 8 is a microchannel flat tube, and the heat exchange tube 8 includes a plurality of channels 81 extending along its length direction, and the plurality of channels 81 are arranged at intervals in a width direction of the heat exchange tube 8. Specifically, as shown in FIGS. 1 and 4, the heat exchange tube 8 is a flat tube, and the length direction of the heat exchange tube 8 is an up-down direction in FIG. 1. The plurality of channels 81 are arranged in the heat exchange tube 8. As shown in FIG. 5, the plurality of channels 81 extend along the length direction of the heat exchange tube 8, top ends of the plurality of channels 81 are all communicated with the corresponding third tube 3 or fourth tube 4, and bottom ends of the channels 81 are all communicated with the corresponding first tube 1 or second tube 2. The width direction of the heat exchange tube 8 is a left-right direction in FIG. 1, and as shown in FIG. 4, the plurality of channels 81 are sequentially arranged at intervals in the left-right direction.

The heat exchange tube 8 includes a first heat exchange tube 5 and a second heat exchange tube 6. One end of the first heat exchange tube 5 is directly or indirectly connected with the first tube 1, and the other end of the first heat exchange tube 5 is directly or indirectly connected with the third tube 3, so that the first heat exchange tube 5 communicates the first tube 1 with the third tube 3. One end of the second heat exchange tube 6 is directly or indirectly connected with the second tube 2, and the other end of the second heat exchange tube 6 is directly or indirectly connected with the fourth tube 4, so that the second heat exchange tube 6 communicates the second tube 2 with the fourth tube 4. The first heat exchange tube 5 and the second heat exchange tube 6 are arranged at intervals in a length direction of the first tube 1. The first tube is not communicated with the second tube, and the third tube is not communicated with the fourth tube.

Specifically, as shown in FIG. 1, the plurality of heat exchange tubes 8 are provided, and the plurality of heat exchange tubes 8 are arranged at intervals along the front-rear direction (the length direction of the first tube 1 in FIG. 1). Each heat exchange tube 8 is a microchannel flat tube. As shown in FIG. 2, each heat exchange tube 8 is provided with a plurality of channels 81 for the circulation of a cooling medium, the plurality of channels 81 in each heat exchange tube 8 extend along the length direction (the up-down direction in FIG. 1) of the heat exchange tube 8, and the plurality of channels 81 in each heat exchange tube 8 are arranged at intervals along the width direction (the left-right direction in FIGS. 1 and 2) of the heat exchange tube 8.

In some embodiments, the heat exchange tube 8 may be divided into the first heat exchange tube 5 and the second heat exchange tube 6 according to different shapes. The first heat exchange tube 5 may be a straight tube, and the second heat exchange tube 6 may be a tube bent at both ends and having a straight tube section in the middle. A plurality of first heat exchange tubes 5 and a plurality of second heat exchange tubes 6 are provided, and the plurality of first heat exchange tubes 5 and the plurality of second heat exchange tubes 6 are alternately arranged along the length direction of the first tube 1 (the front-rear direction in FIG. 1). It should be noted here that "alternately arranged" should be broadly understood. For example, one or more second heat exchange tubes 6 may be arranged between two adjacent first heat exchange tubes 5, and one or more first heat exchange tubes 5 may be arranged between two adjacent second heat exchange tubes 6. In addition, the plurality of first heat exchange tubes 5 may be divided into a plurality of first heat exchange tube groups, and each first heat exchange tube group may include at least two first heat exchange tubes 5. The plurality of second heat exchange tubes 6 may be divided into a plurality of second heat exchange tube groups, and each second heat exchange tube group may include at least two second heat exchange tubes 6. The first heat exchange tube groups and the second heat exchange tube groups may be alternately arranged. The plurality of first heat exchange tubes 5 and the plurality of second heat exchange tubes 6 all extend in the up-down direction, an top end of each first heat exchange tube 5 is communicated with the third tube 3, and a bottom end of each first heat exchange tube 5 is communicated with the first tube 1, so that the cooling medium can flow along the first tube 1, the first heat exchange tube 5 and the third tube 3. A top end of each second heat exchange tube 6 is communicated with the fourth tube 4, and a bottom end of each second heat exchange tube 6 is communicated with the second tube 2, so that the cooling medium can flow along the second tube 2, the second heat exchange tube 6 and the fourth tube 4.

The fins include first fins 7, and along the length direction of the first tube 1, at least part of the first fins 7 are connected with one first heat exchange tube 5 and the at least part of the first fins 7 are connected with one second heat exchange tube 6. The first heat exchange tube 5, the part of the first fins 7 and the second heat exchange tube 6 are arranged along the length direction of the first tube 1. There are two or more first fins 7.

Specifically, as shown in FIGS. 1 to 6, the fins include a plurality of first fins 7, which are arranged at intervals along the length direction of the first tube 1 (the front-rear direction in FIG. 1), and one heat exchange tube is arranged between any two adjacent first fins 7. The heat exchange tube 8 may be either the first heat exchange tube 5 or the second heat exchange tube 6.

The heat exchange tubes 8 on front and rear sides of each first fin 7 may be different. For example, the front side of each first fin 7 may be connected to one of the first heat exchange tube 5 and the second heat exchange tube 6, and the rear side of each first fin 7 may be connected to the other of the first heat exchange tube 5 and the second heat exchange tube 6.

A width W1 of the first heat exchange tube 5 is smaller than a width Wf of the first fin 7, a width W2 of the second heat exchange tube 6 is smaller than the width Wf of the first fin 7, and the width Wf of the first fin 7 is smaller than a sum of the width W1 of the first heat exchange tube 5 and the width W2 of the second heat exchange tube 6.

Figure 6:
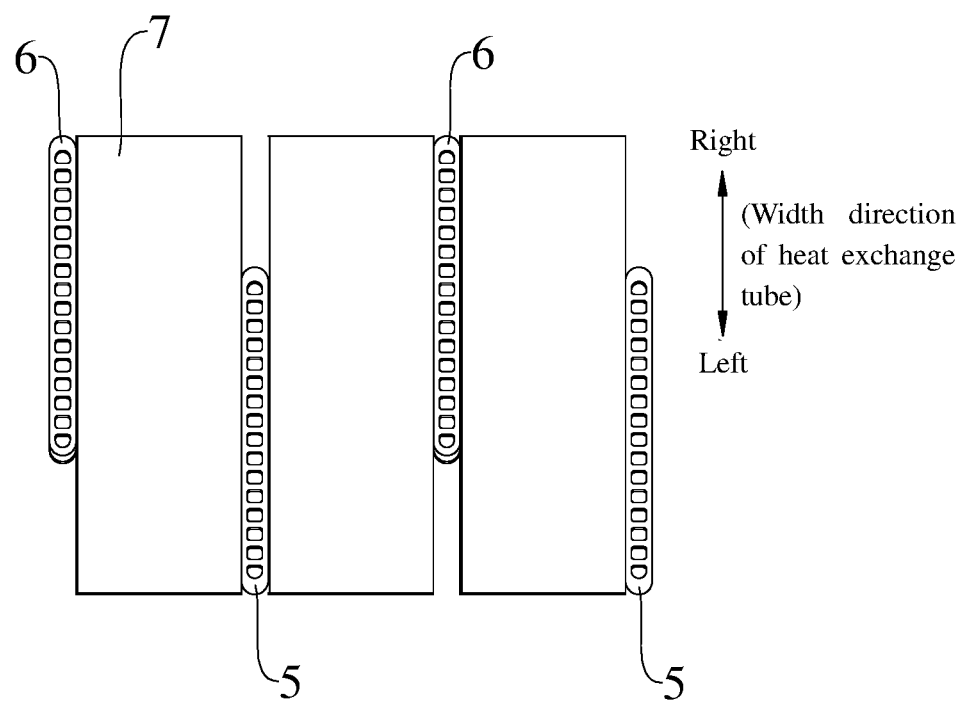
FIG. 6 is a schematic view of staggered arrangement of a first heat exchange tube and a second heat exchange tube in FIG. 1.
Figure 7:
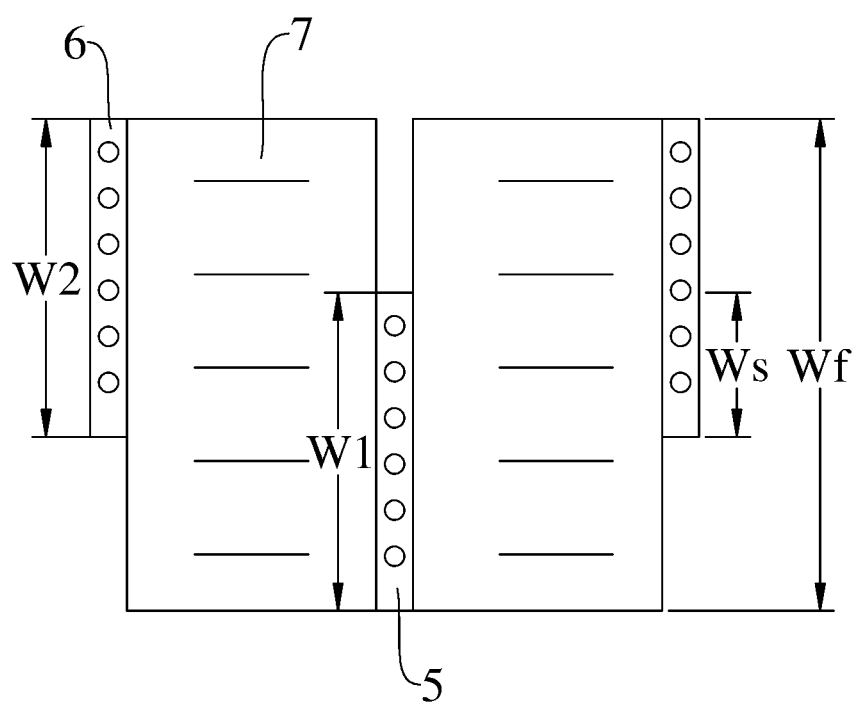
FIG. 7 is a first schematic view of dimension mark in FIG. 6.

As shown in FIGS. 6 and 7, both a width direction of the first heat exchange tube 5 and a width direction of the second heat exchange tube 6 are arranged to extend in the left-right direction. In the left-right direction, the widths of the first heat exchange tube 5, the second heat exchange tube 6 and the first fin 7 are W1, W2 and Wf, respectively. The width W1 of the first heat exchange tube 5 is smaller than the width Wf of the first fin 7, the width W2 of the second heat exchange tube 6 is also smaller than the width Wf of the first fin 7, and the sum of the width W1 of the first heat exchange tube 5 and the width W2 of the second heat exchange tube 6 is larger than the width Wf of the first fin 7.

A plane perpendicular to the length direction of the first tube 1 is defined as a first plane, and a projection of the first heat exchange tube 5 in the first plane is at least partially non-coincident with a projection of the second heat exchange tube 6 in the first plane.

Specifically, the first plane is a vertical plane perpendicular to the front-rear direction. The first heat exchange tube 5 and the second heat exchange tube 6 are projected into the first plane, and the projection of the first heat exchange tube 5 and the projection of the second heat exchange tube 6 are partially overlapped in the first plane, while partially non-coincident.

Figure 9:
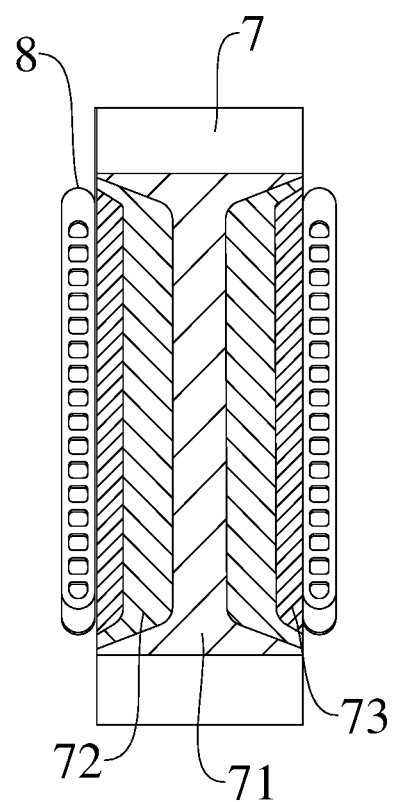
FIG. 9 is a schematic view of thermal energy distribution of a widened fin in the related art.
Figure 10:
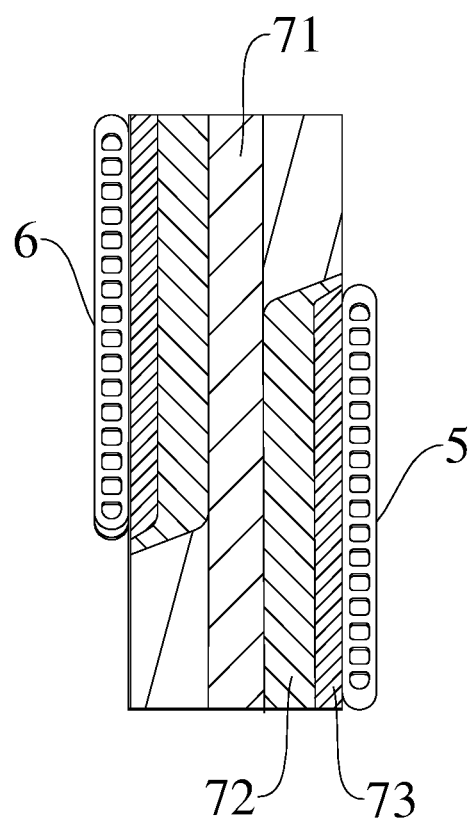
FIG. 10 is a schematic view of thermal energy distribution of a fin in FIG. 6.

According to the heat exchanger 100 of the embodiments of the present disclosure, FIGS. 9 and 10 show the heat transfer from the heat exchange tube, i.e. the flat tube, to the fins. The farther a part of the fin is from the joint between the heat exchange tube 8 and the fin, the smaller the contribution of the part of the fin to the heat exchange of the heat exchange tube.

As shown in FIG. 9, when the flat tubes on both sides of the fin are equal in width and flush in the width direction of the flat tubes, a fin area limited by the width of the flat tube and the height of the fin is a heat affected zone. If only the width of the fin is increased, for example, the width of the fin is greater than the width of the flat tube and the fin protrudes out of the two flat tubes, the fin area in the heat affected zone does not increase significantly, which has little effect on improving the heat transfer performance, but increases the wind resistance on the air side, thus affecting the heat transfer performance.

Specifically, as shown in FIG. 9, two heat exchange tubes are flat tubes. When the width of the first fin 7 is larger than the widths of the heat exchange tubes 8 on both sides, and when the two heat exchange tubes work at the same time, the first fin 7 shows higher heat flux density in areas adjacent to the heat exchange tubes on both sides. According to the heat flux density, a part of the first fin 7 between the heat exchange tubes 8 on both sides may be roughly divided into a first thermal zone 71, a second thermal zone 72 and a third thermal zone 73. The first thermal zone 71 is generally located in the middle of the height of the first fin, and the second thermal zone 72 and the third thermal zone 73 are sequentially distributed on both sides of the first thermal zone 71, respectively. The heat flux density of the third thermal zone 73 is higher than the heat flux density of the second thermal zone 72, and the heat flux density of the second thermal zone 72 is higher than the heat flux density of the first thermal zone 71. The heat flux density is relatively small at two ends of the first fin 7 which exceed the heat exchange tube 8. The distribution and area of the thermal zone here do not represent the strict location division and area size, but only indicate that there are different trends and laws of heat density distribution.

For the fin in the present disclosure, as shown in FIG. 10, due to the staggered arrangement of the first heat exchange tube 5 and the second heat exchange tube 6 in the width direction of the heat exchange tube, not only the heat exchange area of the fin on the air side is increased, but also the fin area in the heat affected zone of the two heat exchange tubes is significantly increased, which is beneficial to improving the heat exchange between the flat tube and the fin, so that the overall heat exchange performance of the heat exchanger 100 can be improved.

Specifically, as shown in FIG. 10, since the first heat exchange tube 5 and the second heat exchange tube 6 are staggered in a width direction of the first fin 7, the first thermal zone 71 of the first fin 7 will be distributed along the width direction of the first heat exchange tube 5 and the second heat exchange tube 6, that is, the first fin 7 covers the entire width of the first heat exchange tube 5 and the second heat exchange tube 6 which are staggered, and the second thermal zone 72 and the third thermal zone 73 are located in the areas of the first fin 7 adjacent to the first heat exchange tube 5 and the second heat exchange tube 6, respectively. Since either side of the first fin 7 is connected with the first heat exchange tube 5 or the second heat exchange tube 6 respectively, the part of the first fin 7 exceeding the first heat exchange tube 5 or the second heat exchange tube 6 increases the area of the heat affected zone, when the two heat exchange tubes work at the same time, thereby improving the heat exchange performance of the heat exchanger 100.

In addition, when the width of the fin increases, the wind resistance will also increase. By designing the width of the first heat exchange tube 5 and the width of the second heat exchange tube 6 to be smaller than the width of the fin, and designing the sum of the width of the first heat exchange tube 5 and the width of the second heat exchange tube 6 to be larger than the width of the fin, the width of the fin in the affected area can be increased to improve the amount of heat exchange, and also, the influence on the amount of heat exchange due to the increase of the wind resistance can be reduced, thus improving the heat exchange performance of the heat exchanger 100.

In addition, when the heat exchanger 100 is used as an evaporator for a heat pump unit, only one side of the fin on the windward side of the structure in the present disclosure is directly connected with the heat exchange tube 8 under a frosting condition of the heat pump, so that the heat flux density on the windward side is relatively reduced, which is beneficial to reducing the frosting amount on the windward side. Meanwhile, under the condition of ensuring the overall heat exchange capacity of the heat exchanger 100, the frosting layer can be more evenly distributed in the width direction of the fin, which is beneficial to improving the system energy efficiency under the frosting condition.

Figure 11:
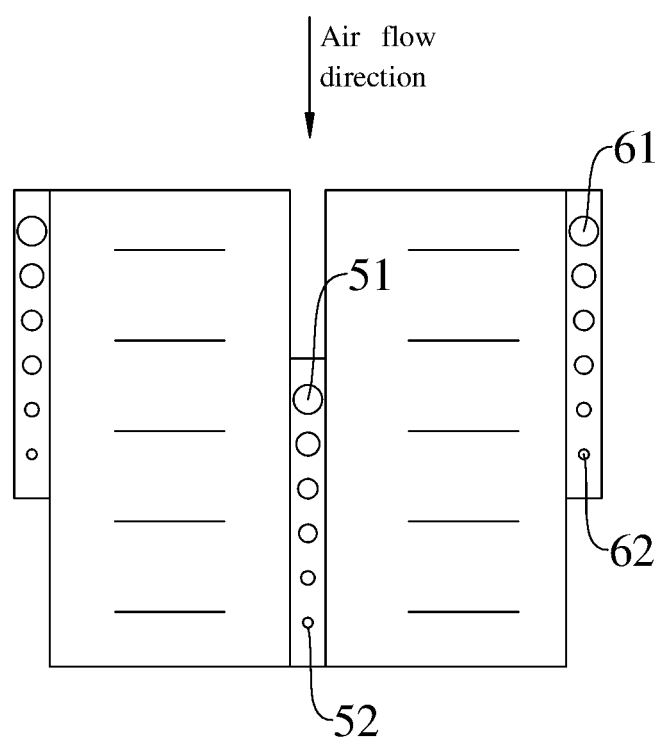
FIG. 11 is a cross-sectional view of a part of a heat exchanger according to another embodiment of the present disclosure.

In some embodiments, the width directions of the first heat exchange tube 5 and the second heat exchange tube 6 are approximately parallel, and the width W1 of the first heat exchange tube 5 is greater than the width W2 of the second heat exchange tube 6. Specifically, as shown in FIGS. 7 and 11, the heat exchanger 100 has a windward side and a leeward side during use. During installing, the first heat exchange tube 5 with the larger width W1 may be installed on the windward side, and the second heat exchange tube 6 with the smaller width W2 may be installed on the leeward side, so that the heat exchange tube with higher heat can be in contact with the air flow first, which is beneficial to improving the heat exchange efficiency.

It can be understood that in other embodiments, the width W2 of the second heat exchange tube 6 may be larger than the width W1 of the first heat exchange tube 5.

Figure 14:
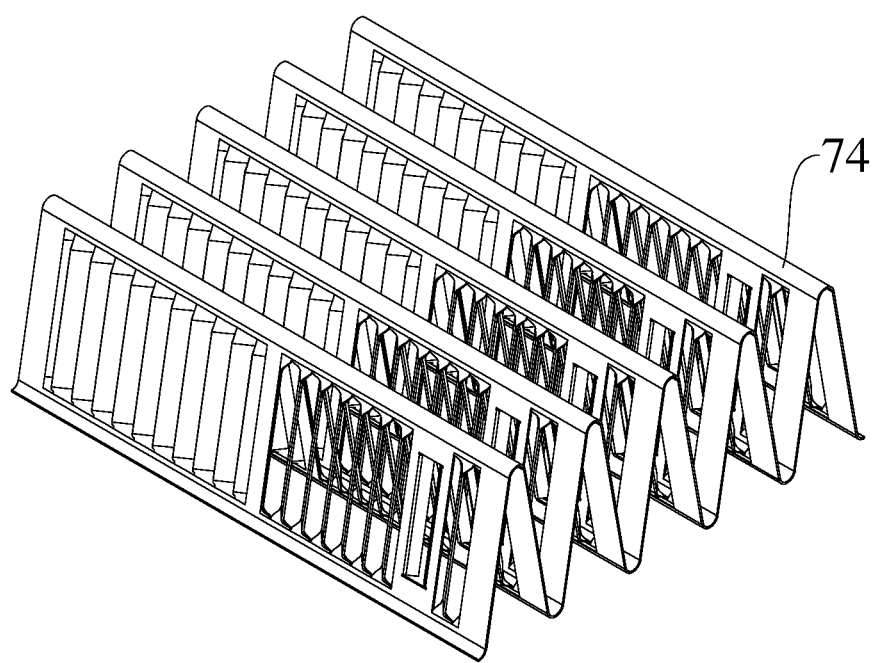
FIG. 14 is a schematic view of a fin according to an embodiment of the present disclosure.

It can be understood that the first fin 7 may be a wave-like fin extending along the length direction of the first heat exchange tube 6. As shown in FIG. 14, each fin includes a plurality of sine-shaped fin units 74, and the respective fin units 74 are connected in sequence end to end. It can be understood that in other embodiments, the fin unit 74 may also be triangular, trapezoidal or the like.

Figure 15:
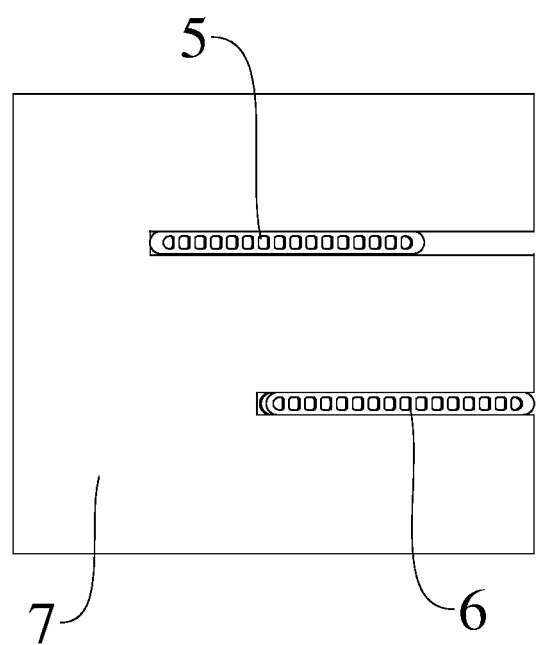
FIG. 15 is a schematic view of a fin according to another embodiment of the present disclosure.

In some embodiments, as shown in FIG. 15, the first fin 7 may also be a cross-inserted fin or a tube-penetrating fin, the length direction of each fin is parallel to a thickness direction of the first heat exchange tube 5, and the first heat exchange tube 5 and the second heat exchange tube 6 are inserted into the fin for heat exchange.

Figure 16:
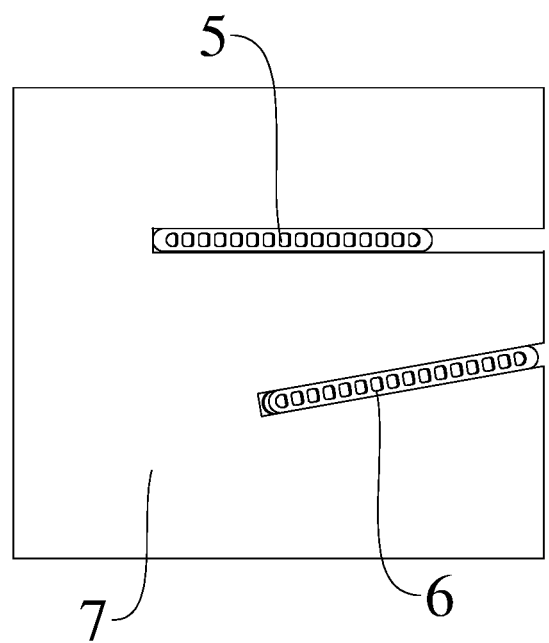
FIG. 16 is a schematic view of a fin according to yet another embodiment of the present disclosure.

In some embodiments, as shown in FIG. 16, the width directions of the first heat exchange tube 5 and the second heat exchange tube 6 may not be parallel, the second heat exchange tube 6 is obliquely inserted into the first fin 7, and its width direction is at an angle with the width direction of the first heat exchange tube 5. In this way, the width of the heat exchange tube can be increased without excessively increasing the width of the first fin 7, and the heat exchange performance of the heat exchange tube side can be improved while controlling the increase of the wind resistance, which is beneficial to improving the overall performance of the heat exchanger.

In some embodiments, the smaller one of one third of the width W1 of the first heat exchange tube 5 and one third of the width W2 of the second heat exchange tube 6 is smaller than a width Ws of an overlapping part of the projection of the first heat exchange tube 5 in the first plane and the projection of the second heat exchange tube 6 in the first plane. The smaller one of the width W1 of the first heat exchange tube 5 and the width W2 of the second heat exchange tube 6 is larger than the width Ws of the overlapping part of the projection of the first heat exchange tube 5 in the first plane and the projection of the second heat exchange tube 6 in the first plane.

As shown in FIG. 7, in the first plane perpendicular to the front-rear direction, the projection of the first heat exchange tube 5 in the first plane and the projection of the second heat exchange tube 6 in the first plane have the overlapping part, and the width of the overlapping part of the projection of the first heat exchange tube 5 and the projection of the second heat exchange tube 6 in the left-right direction is Ws.

The smaller one of one third of the width W1 of the first heat exchange tube 5 and one third of the width W2 of the second heat exchange tube 6 is smaller than the above width Ws.

The smaller one of the width W1 of the first heat exchange tube 5 and the width W2 of the second heat exchange tube 6 is larger than the above width Ws.

Thus, the quantitative design of the width W1 of the first heat exchange tube 5, the width W2 of the second heat exchange tube 6, and the width Ws of the overlapping part of the projection of the first heat exchange tube 5 and the projection of the second heat exchange tube 6 is realized, which ensures that the influence on the amount of heat exchange due to the increase of the effective area of the fin is greater than the decrease of the amount of heat exchange due to the increase of the wind resistance. In addition, when only a single system works, the heat exchange tubes corresponding to the overlapping part of the projections can conduct heat together in the heat affected zone to increase the heat exchange area when the single system works.

In some embodiments, the minimum distance between a projection of an end of the first heat exchange tube 5 on a side in its width direction in the first plane and a projection of an end of the first fin 7 on the same side in the width direction in the first plane is WK1, and the distance WK1 is smaller than the width W2 of the second heat exchange tube 6.

Figure 8:
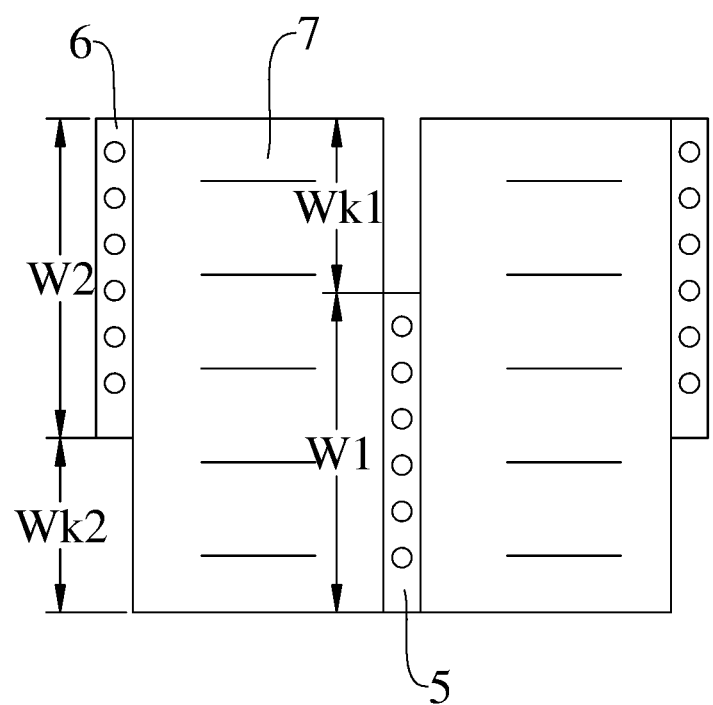
FIG. 8 is a second schematic view of dimension mark in FIG. 6.

As shown in FIG. 8, in the left-right direction, a left end of the first heat exchange tube 5 is flush with a left end of the first fin 7, a distance between a right end of the first heat exchange tube 5 and a right end of the first fin 7 is WK1, and the distance WK1 is smaller than the width W2 of the second heat exchange tube 6. Since a side of a section of the fin corresponding to the distance WK1 is directly connected with the second heat exchange tube 6, increasing the length of the distance WK1 can effectively improve the heat exchange capacity of the second heat exchange tube 6. However, another side of the section of the fin corresponding to the distance WK1 is not directly connected with the first heat exchange tube 5, and increasing the distance WK1 will lead to the increase of the wind resistance. Thus, that the distance WK1 is smaller than the width W2 of the second heat exchange tube 6 is beneficial to balancing the relationship between the heat exchange capacity and the wind resistance, especially when the two systems work at the same time, thus improving the overall heat exchange performance. On the other hand, when the single system runs, this is beneficial to forming an effective heat conduction between the two heat exchange tubes and hence improving the heat exchange capacity of the single system.

In some embodiments, the minimum distance between a projection of an end of the second heat exchange tube 6 on a side in its width direction in the first plane and a projection of an end of the first fin 7 on the same side in the width direction in the first plane is WK2, the distance WK2 is smaller than the width W1 of the first heat exchange tube 5, and the width W1 of the first heat exchange tube 5 is greater than or equal to the width W2 of the second heat exchange tube 6.

As shown in FIG. 8, in the left-right direction, a right end of the second heat exchange tube 6 is flush with the right end of the first fin 7, the distance between a left end of the second heat exchange tube 6 and the left end of the first fin 7 is WK2, the distance WK2 is smaller than the width W1 of the first heat exchange tube 5, and the width W1 of the first heat exchange tube 5 is not smaller than the width W2 of the second heat exchange tube 6.

In some embodiments, the sum of the flow cross-sectional areas of the channels 81 in the first heat exchange tube 5 is greater than the sum of the flow cross-sectional areas of the channels 81 in the second heat exchange tube 6.

Figure 12:
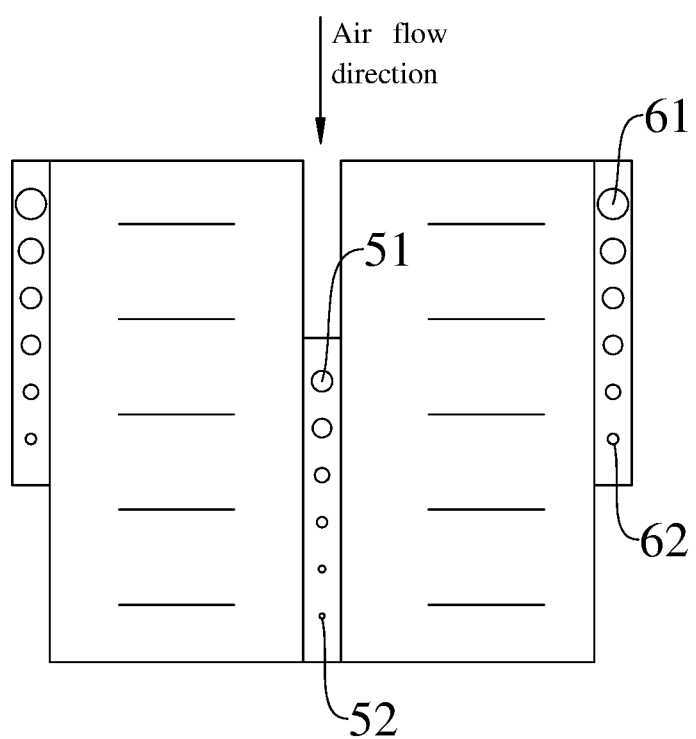
FIG. 12 is a cross-sectional view of a part of a heat exchanger according to yet another embodiment of the present disclosure.

Both the first heat exchange tube 5 and the second heat exchange tube 6 have a plurality of channels 81. As shown in FIG. 12, the plurality of channels 81 in the first heat exchange tube 5 and the plurality of channels 81 in the second heat exchange tube 6 are arranged at intervals along the left-right direction, and the sum of the flow cross-sectional areas of the plurality of channels 81 in the first heat exchange tube 5 is greater than the sum of the flow cross-sectional areas of the plurality of channels 81 in the second heat exchange tube 6. Therefore, when the heat exchanger 100 is installed, the first heat exchange tube 5 may be installed on the windward side. Since the total flow cross-sectional area in the first heat exchange tube 5 is larger and the flow rate of the cooling medium in the first heat exchange tube 5 is larger, the first heat exchange tube 5 has a higher heat exchange performance, the temperature of the air flow after heat exchange by the first heat exchange tube 5 drops, and the air flow with a lower temperature will then flow through the second heat exchange tube 6. Since the flow rate of the cooling medium in the second heat exchange tube 6 is smaller, the cooling of the air flow whose temperature has dropped can be fully met, and this design is beneficial to improving the heat exchange efficiency and reducing the energy consumption.

In some embodiments, a projection of an end of the first heat exchange tube 5 in the width direction is flush with a projection of one end of the first fin 7 in the width direction, and a projection of an end of the second heat exchange tube 6 in the width direction is flush with a projection of the other end of the first fin 7 in the width direction.

Specifically, as shown in FIG. 6, in the left-right direction, the left end of the first heat exchange tube 5 is flush with the left end of the first fin 7, and the right end of the second heat exchange tube 6 is flush with the right end of the first fin 7. Therefore, the situation that the left and right ends of the first fin 7 exceed the first heat exchange tube 5 and the second heat exchange tube 6 can be avoided, which is beneficial to increasing the total heat on the first fin 7 and is further beneficial to improving the heat exchange efficiency.

In some embodiments, the first heat exchange tube 5 includes a first channel 51 and a second channel 52, the flow cross-sectional area of the first channel 51 on the cross section of the first heat exchange tube 5 is larger than the flow cross-sectional areas of other channels on the cross section of the first heat exchange tube 5, and the flow cross-sectional area of the second channel 52 on the cross section of the heat exchange tube is smaller than the flow cross-sectional areas of the other channels on the cross section of the first heat exchange tube 5. The second heat exchange tube 6 includes a third channel 61 and a fourth channel 62. The flow cross-sectional area of the third channel 61 on the cross section of the second heat exchange tube 6 is larger than the flow cross-sectional areas of other channels on the cross section of the second heat exchange tube 6, and the flow cross-sectional area of the fourth channel 62 on the cross section of the second heat exchange tube 6 is smaller than the flow cross-sectional areas of the other channels on the cross section of the second heat exchange tube 6.

As shown in FIG. 11, the channels in the first heat exchange tube 5 include the first channel 51 and the second channel 52. The flow cross-sectional area of the first channel 51 is larger than the flow cross-sectional area of the second channel 52, and the flow cross-sectional area of the first channel 51 is the largest and the flow cross-sectional area of the second channel 52 is the smallest in the first heat exchange tube 5. The first channel 51 is arranged at the right end of the first heat exchange tube 5, the second channel 52 is arranged at the left end of the first heat exchange tube 5, and the remaining channels in the first heat exchange tube 5 are arranged between the first channel 51 and the second channel 52.

The channels in the second heat exchange tube 6 include the third channel 61 and the fourth channel 62. The flow cross-sectional area of the third channel 61 is larger than the flow cross-sectional area of the fourth channel 62, and the flow cross-sectional area of the third channel 61 is the largest and the flow cross-sectional area of the fourth channel 62 is the smallest in the second heat exchange tube 6. The third channel 61 is arranged at the right end of the second heat exchange tube 6, the fourth channel 62 is arranged at the left end of the second heat exchange tube 6, and the remaining channels in the second heat exchange tube 6 are arranged between the third channel 61 and the fourth channel 62.

When the heat exchanger 100 is installed, the first channel 51 and the third channel 61 may be installed on the windward side, and the second channel 52 and the fourth channel 62 may be installed on the leeward side. The first channel 51 and the third channel 61 are arranged on the windward side of the heat exchange tube, have a large heat exchange temperature difference and also have a large flow area at the same time, so that the amount of the refrigerant that can pass through is increased, which is beneficial to improving the heat exchange capacity of the heat exchange tube 8, thus improving the heat exchange capacity of the heat exchanger 100.

In some embodiments, on the first fin 7, a fin density adjacent to one end of the first fin 7 is different from a fin density adjacent to the other end of the first fin 7.

Specifically, the first fin 7 may have a varying density in the width direction of the heat exchange tube, for example, the fin density on the leeward side is large, and the fin density on the windward side is small. Due to the small heat exchange temperature difference and the weak heat exchange capacity on the leeward side, the refrigerant in the channel of the heat exchange tube on the leeward side cannot be fully heat-exchanged. However, the fin density on the leeward side is large to effectively increase the heat exchange area, thus achieving the effect of compensating the heat exchange. In addition, the fin density on the windward side is small and the fin density on the leeward side is large, which is beneficial to improving the frosting performance of the heat exchanger 100.

An air conditioning system according to the embodiments of the present disclosure will be described below.

The air conditioning system according to the embodiments of the present disclosure includes a first circuit 200, a second circuit 300 and a heat exchanger, and the heat exchanger may be the heat exchanger 100 described in the above embodiments. The first circuit 200 is communicated with the first tube 1 and the third tube 3 of the heat exchanger 100, and the first circuit 200 includes a first compressor 202 and a first throttling device 201. The second circuit 300 is communicated with the second tube 2 and the fourth tube 4 of the heat exchanger 100, and the second circuit 300 includes a second compressor 302 and a second throttling device 301.

Figure 13:
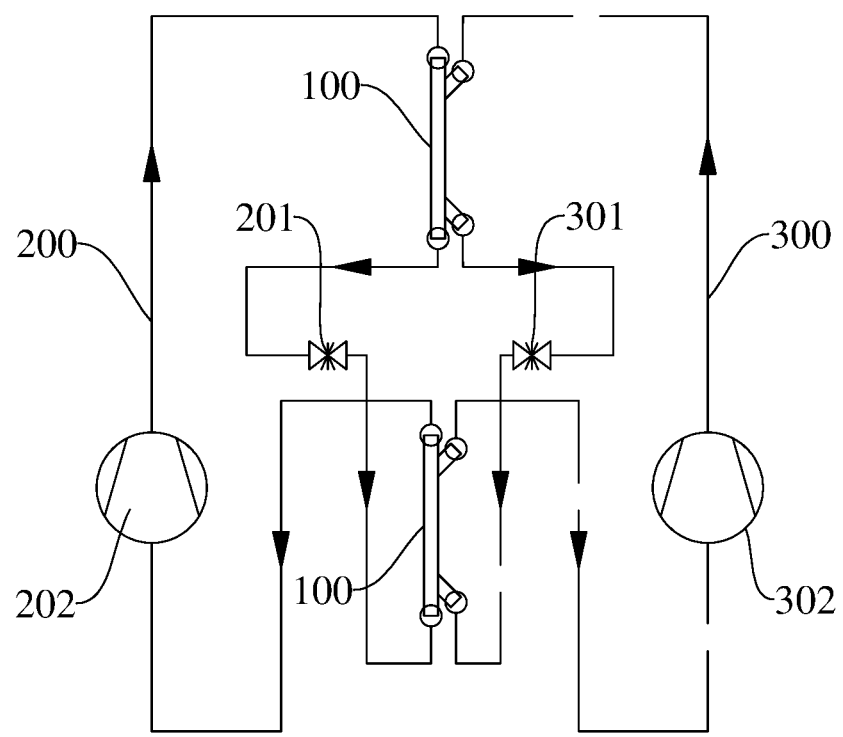
FIG. 13 is a schematic view of an air conditioning system according to an embodiment of the present disclosure.

As shown in FIG. 13, the first circuit 200 and the second circuit 300 are both closed-loop pipelines. There are two heat exchangers 100. The heat exchanger 100 includes the first heat exchange tube and the second heat exchange tube. The first circuit 200 includes the first compressor 202 and the first throttling device 201. The respective first heat exchange tubes of the two heat exchangers 100 are both connected in series to the first circuit 200. The second circuit 300 includes the second compressor 302 and the second throttling device 301, and the respective second heat exchange tubes of the two heat exchangers 100 are both connected in series to the second circuit 300.

When in use, the cooling medium will circulate along the first circuit 200 and the second circuit 300 respectively. In the first circuit 200, the cooling medium flowing out of the first compressor 202 will flow through the first heat exchange tube of one heat exchanger 100, the first throttling device 201, the first heat exchange tube of the other heat exchanger 100 in sequence, and finally flow back into the first compressor 202. In the second circuit 300, the cooling medium flowing out of the second compressor 302 will flow through the second heat exchange tube of one heat exchanger 100, the second throttling device 301 and the second heat exchange tube of the other heat exchanger 100 in sequence, and finally flow back into the second compressor 302.

According to the air conditioning system of the embodiments of the present disclosure, the heat exchanger 100 of the air conditioning system increases the effective heat exchange area of the fins and improves the heat exchange performance of the air conditioning system.

As used herein, the "microchannel flat tube" is a thin-walled, porous, and flat-tubular material made of a refined aluminum rod through hot extrusion and anti-corrosion treatment by spraying zinc on the surface.

In the description of the present disclosure, it should be understood that the orientation or positional relationship indicated by the terms "center". "longitudinal", "transverse", "length", "width", "thickness", "up", "down", "front", "back", "left", "right", "vertical", "horizontal", "top", "bottom", "inside", "outside", "clockwise", "counter-clockwise", "axial", "radial" and "circumferential" and the like, is based on the orientation or positional relationship shown in the attached drawings, which is only for the convenience of describing the present disclosure and simplifying the description, and does not indicate or imply that the referred device or element must have a specific orientation, and be constructed and operated in a specific orientation, so it cannot be understood as a limitation of the present disclosure.

In addition, the terms "first" and "second" are only used for purpose of description, and cannot be understood as indicating or implying relative importance or implicitly indicating the number of indicated technical features. Therefore, the feature defined as "first" or "second" may explicitly or implicitly include at least one such feature. In the description of the present disclosure, "a plurality of" means at least two, such as two, three, etc., unless otherwise specifically defined.

In the present disclosure, unless otherwise expressly defined, terms such as "install", "interconnect", "connect", "fix" shall be understood broadly, and may be, for example, fixed connections, detachable connections, or integral connections; may also be mechanical or electrical connections or intercommunication; may also be direct connections or indirect connections via intervening media; may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on", "above", or "on top of" a second feature may include an embodiment in which the first feature is right or obliquely "on", "above", or "on top of" the second feature, or just means that the first feature is at a height higher than that of the second feature, while a first feature "below", "under", or "on bottom of" a second feature may include an embodiment in which the first feature is right or obliquely "below", "under", or "on bottom of" the second feature, or just means that the first feature is at a height lower than that of the second feature.

In the description of the present disclosure, terms such as "an embodiment", "some embodiments", "an example", "a specific example" or "some examples" means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are illustrative and shall not be understood as limitation to the present disclosure, and changes, modifications, alternatives and variations can be made in the above embodiments within the scope of the present disclosure by those skilled in the art.

The invention claimed is:

1. A heat exchanger, comprising:
   a first assembly comprising a first tube and a second tube;
   a second assembly comprising a third tube and a fourth tube;
   fins comprising a plurality of first fins;
   a plurality of heat exchange tubes;
   wherein each heat exchange tube is a flat tube and comprises a plurality of channels extending along a length direction of each heat exchange tube, the plurality of channels being arranged at intervals in a width direction of each heat exchange tube, wherein the plurality of heat exchange tubes comprise a first heat exchange tube and a second heat exchange tube, one end of the first heat exchange tube is directly or indirectly connected with the first tube, another end of the first heat exchange tube is directly or indirectly connected with the third tube, the first heat exchange tube communicates the first tube with the third tube, one end of the second heat exchange tube is directly or indirectly connected with the second tube, another end of the second heat exchange tube is directly or indirectly connected with the fourth tube, the second heat exchange tube communicates the second tube with the fourth tube, the first heat exchange tube and the second heat exchange tube are arranged at an interval in a length direction of the first tube, the first tube is not communicating with the second tube, and the third tube is not communicating with the fourth tube, wherein a first fin of the plurality of first fins is connected with the first heat exchange tube and connected with the second heat exchange tube in the length direction of the first tube, and the first heat exchange tube, part of the first fin and the second heat exchange tube are arranged along the length direction of the first tube, wherein a width of the first heat exchange tube is smaller than a width of the first fin, a width of the second heat exchange tube is smaller than the width of the first fin, and the width of the first fin is smaller than a sum of the width of the first heat exchange tube and the width of the second heat exchange tube, wherein a plane perpendicular to the length direction of the first tube is defined as a first plane, and a projection of the first heat exchange tube on the first plane and a projection of the second heat exchange tube on the first plane are at least partially non-coincident, wherein a first minimum distance between a projection of an end of the width of the first heat exchange tube on the first plane and a projection of an end of a width the first fin on the first plane is smaller than the width of the second heat exchange tube, the end of the width of the first heat exchange tube and the end of the width of the first fin being on a same side, and adjacent first fins connected to the first heat exchange tube are spaced apart from each other in a thickness direction of the first heat exchange tube by a gap defined by the first minimum distance, wherein a second minimum distance between a projection of an end of the width of the second heat exchange tube on the first plane and a projection of another end of the width of the first fin on the first plane is smaller than the width of the first heat exchange tube, the end of the width of the second heat exchange tube and the another end of the width of the first fin being on another same side, and adjacent first fins connected to the second heat exchange tube are spaced apart from each other in a thickness direction of the second heat exchange tube by a gap defined by the second minimum distance, and the width of the first heat exchange tube is greater than or equal to the width of the second heat exchange tube.

2. The heat exchanger according to claim 1, wherein a width direction of the first heat exchange tube and a width direction of the second heat exchange tube are parallel to each other, and the width of the first heat exchange tube is greater than the width of the second heat exchange tube.

3. The heat exchanger according to claim 1, wherein a smaller one of one third of the width of the first heat exchange tube and one third of the width of the second heat exchange tube is smaller than a width of an overlapping part of the projection of the first heat exchange tube on the first plane and the projection of the second heat exchange tube on the first plane.

4. The heat exchanger according to claim 1, wherein a smaller one of the width of the first heat exchange tube and the width of the second heat exchange tube is larger than a width of an overlapping part of the projection of the first heat exchange tube on the first plane and the projection of the second heat exchange tube on the first plane.

5. The heat exchanger according to claim 1, wherein in the first plane, a projection of another end of the width of the first heat exchange tube is flush with a projection of the another end of the width of the first fin, and a projection of another end of the width of the second heat exchange tube is flush with a projection of the end of the width the first fin.

6. The heat exchanger according to claim 1, wherein the first heat exchange tube comprises a first channel and a second channel, a flow cross-sectional area of the first channel on a cross section of the first heat exchange tube is larger than flow cross-sectional areas of other channels on the cross section of the first heat exchange tube, and a flow cross-sectional area of the second channel on the cross section of the first heat exchange tube is smaller than the flow cross-sectional areas of the other channels on the cross section of the first heat exchange tube.

7. The heat exchanger according to claim 6, wherein the second heat exchange tube comprises a third channel and a fourth channel, a flow cross-sectional area of the third channel on a cross section of the second heat exchange tube is larger than flow cross-sectional areas of other channels on the cross section of the second heat exchange tube, and a flow cross-sectional area of the fourth channel on the cross section of the second heat exchange tube is smaller than the flow cross-sectional areas of the other channels on the cross section of the second heat exchange tube.

8. The heat exchanger according to claim 1, wherein each heat exchange tube is a microchannel flat tube.

9. An air conditioning system, comprising:
a heat exchanger, comprising:
a first assembly comprising a first tube and a second tube;
a second assembly comprising a third tube and a fourth tube;
fins comprising a plurality of first fins;
a first circuit comprising a first compressor and a first throttling device;
a second circuit comprising a second compressor and a second throttling device; and
a plurality of heat exchange tubes,
wherein each heat exchange tube is a flat tube and comprises a plurality of channels extending along a length direction of each heat exchange tube, the plurality of channels being arranged at intervals in a width direction of each heat exchange tube,
wherein the plurality of heat exchange tubes comprise a first heat exchange tube and a second heat exchange tube, one end of the first heat exchange tube is directly or indirectly connected with the first tube, another end of the first heat exchange tube is directly or indirectly connected with the third tube, the first heat exchange tube communicates the first tube with the third tube, one end of the second heat exchange tube is directly or indirectly connected with the second tube, another end of the second heat exchange tube is directly or indirectly connected with the fourth tube, the second heat exchange tube communicates the second tube with the fourth tube, the first heat exchange tube and the second heat exchange tube are arranged at an interval in a length direction of the first tube, the first tube is not communicating with the second tube, the third tube is not communicating with the fourth tube, wherein a first fin of the plurality of first fins is connected with the first heat exchange tube and connected with the second heat exchange tube in the length direction of the first tube, and the first heat exchange tube, part of the first fin and the second heat exchange tube are arranged along the length direction of the first tube, wherein a width of the first heat exchange tube is smaller than a width of the first fin, a width of the second heat exchange tube is smaller than the width of the first fin, and the width of the first fin is smaller than a sum of the width of the first heat exchange tube and the width of the second heat exchange tube, wherein a plane perpendicular to the length direction of the first tube is defined as a first plane, and a projection of the first heat exchange tube on the first plane and a projection of the second heat exchange tube on the first plane are at least partially non-coincident, wherein a first minimum distance between a projection of an end of the width of the first heat exchange tube on the first plane and a projection of an end of a width the first fin on the first plane is smaller than the width of the second heat exchange tube, the end of the width of the first heat exchange tube and the end of the width of the first fin being on a same side, and adjacent first fins connected to the first heat exchange tube are spaced apart from each other in a thickness direction of the first heat exchange tube by a gap defined by the first minimum distance, wherein a second minimum distance between a projection of an end of the width of the second heat exchange tube on the first plane and a projection of another end of the width of the first fin on the first plane is smaller than the width of the first heat exchange tube, the end of the width of the second heat exchange tube and the another end of the width of the first fin being on another same side, and adjacent first fins connected to the second heat exchange tube are spaced apart from each other in a thickness direction of the second heat exchange tube by a gap defined by the second minimum distance, and the width of the first heat exchange tube is greater than or equal to the width of the second heat exchange tube, and wherein the first circuit communicates with the first tube and the third tube of the heat exchanger, and the second circuit communicates with the second tube and the fourth tube of the heat exchanger.

10. The air conditioning system according to claim 9, wherein a smaller one of one third of the width of the first heat exchange tube and one third of the width of the second heat exchange tube is smaller than a width of an overlapping part of the projection of the first heat exchange tube on the first plane and the projection of the second heat exchange tube on the first plane.

11. The air conditioning system according to claim 9, wherein a smaller one of the width of the first heat exchange tube and the width of the second heat exchange tube is larger than a width of an overlapping part of the projection of the first heat exchange tube on the first plane and the projection of the second heat exchange tube on the first plane.

12. The heat exchanger according to claim 1,
wherein the part of the first fin between the first heat exchange tube and the second heat exchange tube comprises a first thermal zone, a second thermal zone and a third thermal zone, the first thermal zone is located in a middle of a height of the first fin, and the second thermal zone and the third thermal zone are sequentially distributed on both sides of the first thermal zone, respectively,
wherein a heat flux density of the third thermal zone is higher than a heat flux density of the second thermal zone, and the heat flux density of the second thermal zone is higher than a heat flux density of the first thermal zone.

13. The heat exchanger according to claim 1, wherein the first fin is a cross-inserted fin or a tube-penetrating fin, a length direction of the first fin is parallel to the thickness direction of the first heat exchange tube, and the first heat exchange tube and the second heat exchange tube are inserted into the first fin to exchange heat.

14. The heat exchanger according to claim 13, wherein the second heat exchange tube is obliquely inserted into the first fin, and a width direction of the second heat exchange tube is at an angle with a width direction of the first heat exchange tube.

15. The heat exchanger according to claim 7, wherein the first channel and the third channel are installed on a windward side of the heat exchanger, and the second channel and the fourth channel are installed on a leeward side of the heat exchanger.

16. The heat exchanger according to claim 1, wherein on the first fin, a fin density adjacent to one end of the first fin is different from a fin density adjacent to another end of the first fin.

\* \* \* \* \*